Figure 1:
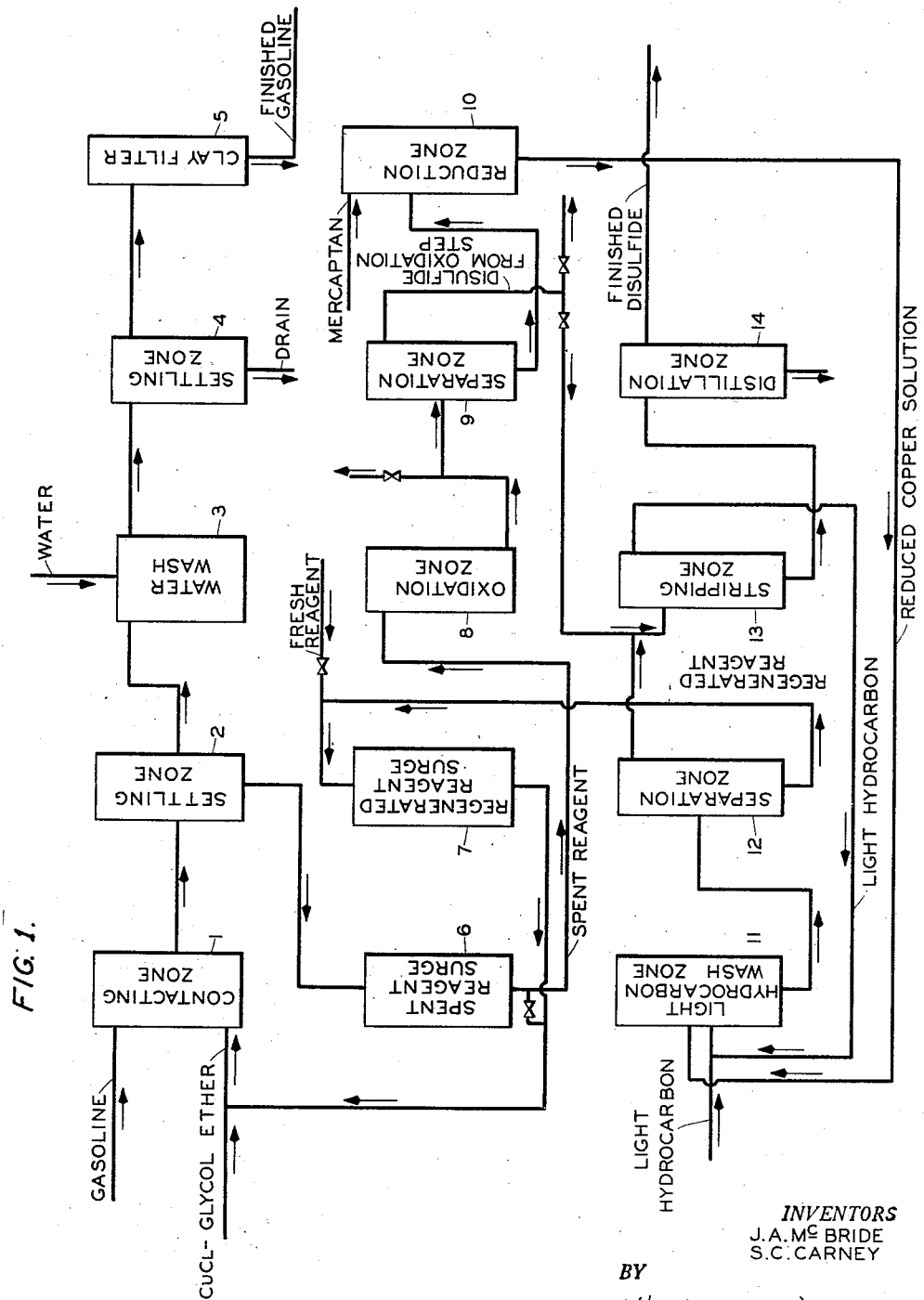

April 11, 1950     J. A. McBRIDE ET AL     2,503,627
REMOVAL OF MERCAPTANS FROM GASOLINE Filed April 27, 1949     2 Sheets-Sheet 1

INVENTORS
J. A. McBRIDE
S. C. CARNEY
BY
Hudson and Young
ATTORNEYS

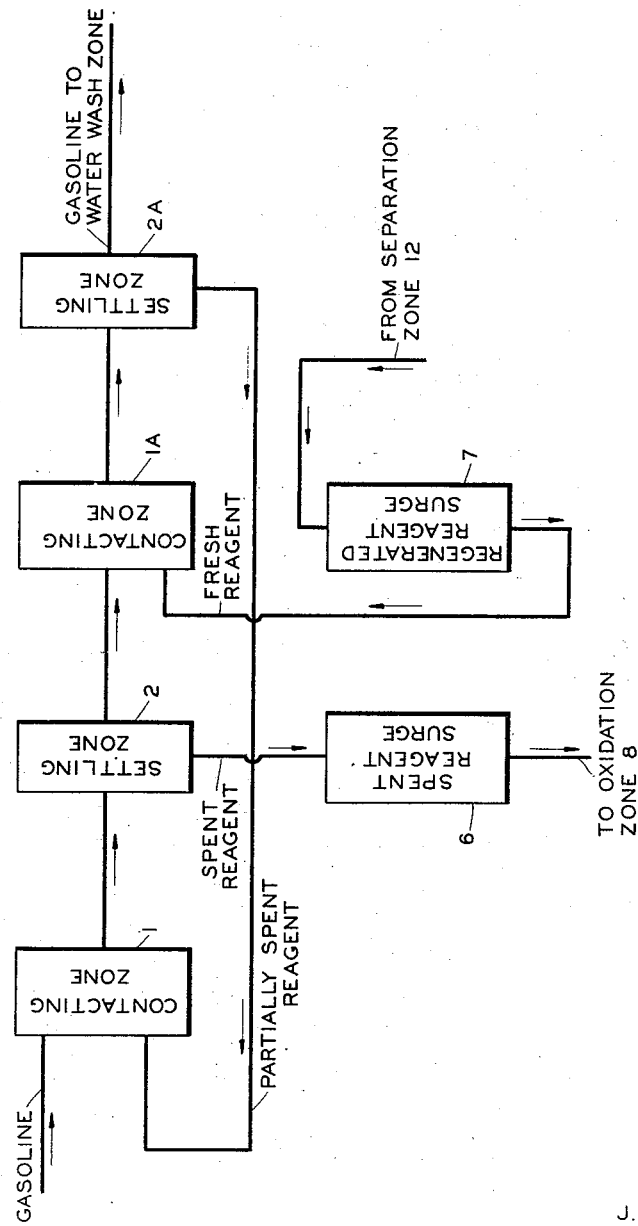

UNITED STATES PATENT OFFICE 2,503,627

REMOVAL OF MERCAPTANS FROM GASOLINE

John A. McBride, Phillips, Tex., and Samuel C. Carney, Bartlesville, Okla., assignors to Phillips Petroleum Company, a corporation of Delaware Application April 27, 1949, Serial No. 89,948

13 Claims. (Cl. 196—30)

This invention relates to the chemical treatment of gasoline. In one of its aspects the invention relates to the removal of mercaptans (sulfur compounds) from gasoline. In another of its aspects the invention relates to the use of a novel treating agent which will convert mercaptans in gasoline to mercaptides which are soluble in said agent, the subsequent separation of which from the gasoline will separate from said gasoline the undesired mercaptans in said converted or dissolved mercaptide form. In another of its aspects the invention relates to the use of a novel treating solution to remove mercaptides from a gasoline which has been treated in a conventional manner with a reagent comprising cupric and cuprous chlorides. In one embodiment of the invention an aqueous glycol ether-cuprous chloride reagent is employed as the treating agent, as more fully set forth and described below. In another embodiment of the invention an aqueous solution of a glycol ether is used as the treating solution.

In the usual "desulfurizing" process the mercaptans in the gasoline are converted to disulfides. These being gasoline-soluble remain in the gasoline. Thus, the product is marketed containing sulfur compounds which it would be highly desirable to remove efficiently in a readily and economically feasible manner.

We have found that the ionization constant of cuprous mercaptide is so low that the reaction between cuprous chloride and mercaptan

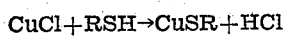

$$CuCl + RSH \rightarrow CuSR + HCl$$

is substantially completed even when the mercaptan is present in great dilution in a considerable volume of gasoline. Also, we have found that both the cuprous mercaptides and cuprous chloride are sufficiently soluble in aqueous glycol ether-cuprous chloride reagent to convert mercaptans in gasoline to mercaptides and to remove the thus formed mercaptides therefrom.

Thus, we have found that upon contacting aqueous glycol ether-cuprous chloride reagent with gasoline, it will convert the mercaptan content thereof substantially to cuprous mercaptides and also that these mercaptides are sufficiently soluble in said reagent in the presence of the gasoline to cause the mercaptides substantially to be taken into said reagent and out from the gasoline. Thus, we have found that the mercaptan content of a gasoline can be converted and removed therefrom by reacting the mercaptans with cuprous chloride to form cuprous mercaptides and then dissolving said cuprous mercaptides in a glycol ether containing solution.

The treating agent containing the cuprous mercaptides can be subjected to oxidation conditions to convert said mercaptides to corresponding disulfides and to cupric chloride. After separation of these disulfides from the treating agent, it can be treated with a mercaptan to form corresponding disulfide and to reform cuprous chloride. The disulfides can be separated from the treating agent and the latter can be re-used in the initial contacting zone.

Thus, according to this invention, there is provided a process by means of which the mercaptans present in a gasoline are not only converted to disulfides but also a process by means of which the disulfide derivatives of the mercaptans in the gasoline are removed therefrom. Thus, the disulfides removed from the gasoline can be recovered in a marketable condition as a by-product of the desulfurization process of the invention.

Thus, according to the present invention, there is provided an integrated operation by means of which mercaptans are removed from a gasoline, thereby desulfurizing said gasoline, in a manner superior to the usual method which merely converts the mercaptans to disulfides which remain soluble and dissolved in the gasoline, and by means of which disulfides are produced in a marketable condition as a by-product of the process. Hence, the undesirable mercaptans in the gasoline are converted to desirable disulfides, separate and apart from said gasoline.

In an alternative embodiment the invention may be practiced as an improvement upon conventional copper treating processes wherein substantial (usually small) amounts of copper mercaptides, formed unintentionally but unavoidably in the treating step, are present in solution in the treated gasoline and must be removed therefrom because of their corrosive nature. In this embodiment the copper mercaptide-containing gasoline is washed with an aqueous glycol ether solution, and the mercaptides are thereby removed from the gasoline. This results in a partial desulfurization of the conventionally copper treated and "sweetened" gasoline. The glycol ether solution may then be oxidized to convert the mercaptides to disulfides, which are readily separated from the glycol ether solution as described hereinafter, and simultaneously convert the copper to cupric chloride which remains dissolved in the glycol ether solution. The glycol ether may then be recovered by distillation for reuse in the process. Alternatively, the glycol ether may be separated from the copper mercaptides by distillation and the mercaptides rejected from the system. Other methods of recovering the glycol ether solution for reuse in the process may be employed if desired, the particular method to be chosen depending upon economic considerations and upon whether it is desired to recover the copper as cuprous mercaptides, cuprous chloride or cupric chloride.

To more fully set forth and to more specifically describe the invention, reference is now made to the drawings in which are shown two diagrammatic embodiments of integrated processes according to the invention.

In Figure 1, gasoline containing mercaptans to be removed therefrom is contacted in contacting zone 1 with an aqueous glycol ether-cuprous chloride treating agent.

The concentration of the cuprous chloride in the treating reagent can be varied. However, it is now preferred to use a treating solution saturated, or nearly saturated, with cuprous chloride. The proportion of the glycol ether relative to that of the water can be varied. However, it is now preferred to operate with about 85%–95% glycol ether and 15%–5% water. As glycol ether there can be employed the monoalkyl ethers of ethylene glycol or diethylene glycol. The alkyl group should contain, preferably, one to four carbon atoms. One skilled in the art can readily determine a glycol ether for use in the process of the invention by mere routine test. It should be noted that the larger the alkyl group, the higher will be the solubility of the gasoline in the glycol ether. Also, it is noted that the nature of the gasoline will affect to an extent its solubility in the glycol ether. Generally, the more aromatic the gasoline, the higher will be its solubility in the glycol ether. Presently preferred as glycol ethers to be employed according to the invention are methyl Carbitol (diethylene glycol monomethyl ether) and methyl Cellosolve (ethylene glycol monomethyl ether).

The temperature in the contacting zone is preferably maintained in the approximate range of 50° F.–160° F.

In the contacting zone the treating agent turns a dark claret color. From this zone, the gasoline and treating solution are transferred to settling zone 2 wherein the gasoline and treating solution form two layers. The gasoline is passed to wash zone 3 wherein it is thoroughly washed with water, after which it is allowed to settle in settling zone 4 wherein water is separated therefrom. The gasoline is then clay-treated in clay filter zone 5 and is now ready for marketing.

Treating or reagent solution separated from the gasoline in settling zone 2 is removed therefrom and passed to spent reagent surge zone 6.

In order to regenerate the treating solution or reagent, at least a portion of it can be withdrawn continuously from zone 6 and passed to oxidation zone 8 wherein it can be blown with air to convert the cuprous mercaptides to cupric chloride and disulfides. Thus, in zone 8 the treating solution can be air blown in the presence of hydrogen chloride until all mercaptide has been oxidized to disulfide.

It is possible to reduce the cupric chloride to cuprous chloride using metallic copper. However, this method has the disadvantage of causing a constant increase in the cuprous chloride to be dealt with, which, being limited in its solubility in the glycol-ether, will gradually build up and precipitate out therefrom. Also, this is a use of copper which is expensive in view of the necessity of disposing ultimately of large quantities of cuprous chloride.

Therefore, as an added feature of this invention, the treating solution, after disulfides are separated from it in separation zone 9, is treated with a mercaptan in reduction zone 10 to reduce cupric chloride to cuprous chloride. Mercaptans will react with the cupric chloride to reduce the cupric ion to cuprous ion with concomitant production of disulfides from the mercptan. The mercaptan used in reduction zone 10 is selected preferably from the alkyl mercaptans containing 1–4 carbon atoms. The spent treating solution is treated with the mercaptan until it turns a pale straw yellow color. Thus, by separating the disulfide formed and recycling the reduced treating solution to the contacting zone to treat further quantities of gasoline, the volume of treating solution is maintained substantially constant and the disposal problem encountered using copper is entirely eliminated.

The mercaptans used in zone 10 to reduce the oxidized reagent can, if desired, be derived from the disulfides produced in oxidation zone 8 and withdrawn from separation zone 9 or from disulfides from another source within or without the system. The conversion of the disulfides to mercaptans can be effected by thermal decomposition of the disulfides or, preferably, by treatment with hydrogen in presence of a sulfactive hydrogenation catalyst.

From reduction zone 10 the treating solution is passed to light hydrocarbon wash zone 11 and then to separation zone 12 in which zones it is washed and readied for reuse. From zone 12 the freshened treating solution is passed into zone 7 and from there reused as described above. A function of zones 11 and 12 is to separate disulfides from the treating solution. This is accomplished by solution of the disulfides in the hydrocarbon washing material from which the disulfides can then be covered in stripping zone 13 and distillation zone 14. The disulfide fraction obtained in zone 9 is advantageously also treated in zones 13 and 14 or it may be recovered separately by means not shown. Thus it is that in this embodiment of the invention, there has been provided a unitary process for the removal of sulfur from gasoline and for its recovery as marketable disulfide.

As an alternative within the scope of the invention here disclosed a mercaptan-containing gasoline can be used as the reducing agent in zone 10. When such a reducing agent is used, the effluent from zone 10 can be passed directly to zone 12 from which regenerated reagent is removed as a lower phase and the gasoline is removed as an upper phase. This gasoline is a sweetened gasoline and can be marketed as such, that is, a gasoline in which the mercaptans have been converted to disulfides (as distinguished from the desulfurized gasoline withdrawn from zone 2). When the immediately preceding step is employed, no mercaptans, other than those in the gasoline employed in said step, need be supplied to zone 10.

As another alternative within the scope of the invention the mercaptans used in zone 10 of the process, can be recovered from the steam stripping of spent caustic which has been used to treat sulfur containing products, as in the oil refinery or, as a further alternative a stream of refinery vapors, comprising $C_4$ and lighter compounds, containing methyl and ethyl mercaptans, can be passed into zone 10 to effect the required reduction therein.

When the mercaptans from stripping of spent caustic are used these can be recovered readily free from hydrogen sulfide which must not be present in zone 10 else it will convert the copper to copper sulfide. When a refinery stream is used the hydrogen sulfide, if any, can be removed from it in a known manner.

It is also within the scope of this invention to contact the gasoline with the aqueous glycol ether-cuprous chloride reagent in separate stages, using partially spent reagent in a first stage and fresh reagent in a second stage. Thus, in the embodiment shown diagrammatically in Figure 2 the gasoline is first contacted in contacting zone 1 with partially spent reagent derived from a subsequent contacting stage. The mixture of gasoline and reagent is passed to settling zone 2, from which spent reagent is withdrawn and passed to spent reagent surge zone 6 while the separated gasoline is passed to contacting zone 1a. Here the gasoline is contacted with fresh or regenerated glycol ether-cuprous chloride reagent and the mixture is passed to settling zone 2a. Partially spent reagent is separated from the gasoline in zone 2a and passed directly into contacting zone 1 as described hereinabove, and the gasoline is passed to further treatment just as in the embodiment of Figure 1. Spent reagent is passed from zone 6 to oxidation zone 8 and subsequent regeneration steps, and regenerated reagent is returned to zone 7, as in Figure 1.

In the process of this invention the mercaptides as formed are dissolved and remain dissolved in the treating solution. Thus, there is encountered no precipitation problem.

In the embodiment wherein the invention is practiced in conjunction with a conventional copper sweetening process, for the removal of dissolved copper mercaptides from the treated gasoline, the treated gasoline is contacted, in a contacting zone like zone 1 of Figure 1, with an aqueous glycol ether solution. This solution differs from the reagent of Figure 1 only in that it contains no copper compounds, or at least is substantially free therefrom. The copper mercaptides are selectively dissolved by the glycol ether solution, so that the gasoline removed from a subsequent separation zone has been partially desulfurized and, more important, is free from the corrosive copper mercaptides formed in the copper treating step. Disulfides, formed in the conventional copper treating step by oxidation of the mercaptans, are of course still present in solution in the gasoline. While this embodiment of the invention is generally less preferable, because the resulting gasoline although "sweet" is only partially desulfurized, it nevertheless provides a worthwhile addition to existing copper sweetening units by enabling them to be operated so as to eliminate copper mercaptides from the treated gasoline without the consumption of an additional reagent (e. g., sodium sulfide) for this purpose. Ths glycol ether solution is readily recovered for reuse in the process as described hereinabove.

The following example is illustrative of the invention:

Example

Twenty-five milliliter portions of a catalytically cracked gasoline, soured by the addition of 0.3 per cent mercaptan sulfur in the form of a mixture of synthetic tertiary mercaptans, were shaken with 25 milliliters of cuprous chloride-methyl Carbitol reagent. The gasoline was washed once with 90 per cent aqueous methyl Carbitol, then with water, and dried. Mercaptan sulfur was determined by a standard titration employing a pyridine-type indicator. Four such portions of soured gasoline were treated with the same portion of reagent; the fourth portion showed no mercaptan sulfur indicating the reagent was still satisfactorily active. Treatment of the desulfurized gasoline with zinc dust and acetic acid produced no titratable mercaptan sulfur, indicating the absence of disulfide in the treated gasoline. Reoxidation of the used reagent caused liberation of the extracted mercaptans in the form of disulfide.

Reasonable variation and modification are possible within the scope of the appended claims to the invention, the essence of which is that a process for the treatment of a sulfur compound containing gasoline has been set forth by means of which it is possible to substantially completely remove the sulfur compounds from said gasoline in a readily feasible and, if desired, cyclic manner, with recovery of the sulfur compounds as disulfides in marketable form, employing in the process a solution of cuprous chloride dissolved in a water solution of a glycol ether or by means of which a conventionally sweetened gasoline can be treated to remove at least a part of the sulfur compounds present therein.

We claim:

1. A process for treating gasoline type hydrocarbons containing mercaptans comprising reacting at least a portion of the mercaptans with cuprous chloride to form cuprous mercaptides and dissolving said cuprous mercaptides in a glycol ether containing solution, and separating said gasoline from said solution.

2. A process for treating gasoline type hydrocarbons containing mercaptans comprising contacting the gasoline with a solution containing cuprous chloride to form cuprous mercaptides and dissolving said cuprous mercaptides in a glycol ether containing solution, and separating said gasoline from said glycol ether-containing solution.

3. A process for treating gasoline type hydrocarbons to remove mercaptans therefrom which comprises contacting said hydrocarbons with a treating agent essentially consisting of an aqueous glycol ether-cuprous chloride reagent and then separating said treating agent from said gasoline.

4. A process for treating gasoline type hydrocarbons to remove mercaptans therefrom which comprises contacting said hydrocarbons with a treating agent essentially consisting of an aqueous glycol ether-cuprous chloride reagent to convert said mercaptans to cuprous mercaptides and to dissolve said mercaptides in said treating agent; separating said treating agent from said gasoline; subjecting said treating agent to oxidation conditions to convert the mercaptides therein to corresponding disulfides and to cupric chloride and then separating said disulfides from said treating solution and the system as a product of the process.

5. A process for treating gasoline type hydrocarbons to remove mercaptans therefrom which comprises contacting said hydrocarbons in an initial zone with a treating agent essentially consisting of an aqueous glycol ether-cuprous chloride reagent to convert said mercaptans to cuprous mercaptides and to dissolve said mercaptides in said treating agent; separating said treating agent from said gasoline; subjecting said treating agent to oxidation conditions to convert the mercaptides therein to corresponding disulfides and to cupric chloride; and then separating said disulfides from said treating solution and the system as a product of the process; then reacting said treating solution containing cupric chloride with a mercaptan to form the corresponding disulfides and to reform cuprous chloride; separating said disulfides from said last mentioned treating solution and from the system as another product of the process and passing said treating solution containing the reformed cuprous chloride to the initial contacting zone.

6. A process for treating gasoline type hydrocarbons to remove mercaptans therefrom which comprises contacting said hydrocarbons in an initial zone with a treating agent essentially consisting of an aqueous glycol ether-cuprous chloride reagent to convert said mercaptans to cuprous mercaptides and to dissolve said mercaptides in said treating agent; separating said treating agent from said gasoline; subjecting said treating agent to oxidation conditions to convert the mercaptides therein to corresponding disulfides and to cupric chloride; and then separating said disulfides from said treating solution and converting said disulfides to mercaptans; then reacting said treating solution containing cupric chloride with said mercaptans to form the corresponding disulfides and to reform cuprous chloride; separating said disulfide from said last mentioned treating solution and from the system as a product of the process; and passing said treating solution containing the reformed cuprous chloride to the initial contacting zone.

7. A process for treating gasoline type hydrocarbons to remove mercaptans therefrom which comprises contacting said hydrocarbons in an initial zone with a treating agent essentially consisting of an aqueous glycol ether-cuprous chloride reagent to convert said mercaptans to cuprous mercaptides and to dissolve said mercaptides in said treating agent; separating said treating agent from said gasoline; subjecting said treating agent to oxidation conditions to convert the mercaptides therein to corresponding disulfides and to cupric chloride; and then separating said disulfides from said treating solution and the system as a product of the process; then reacting said treating solution containing cupric chloride with a mercaptan-containing gasoline to form the corresponding disulfides therein and to reform cuprous chloride in said treating solution; separating a sweetened gasoline from said treating solution as a product of the process; and passing said treating solution containing the reformed cuprous chloride to the initial contacting zone.

8. The oxidation of an aqueous glycol ether-cuprous chloride treating agent which has been used to treat a gasoline to convert mercaptans in said gasoline to mercaptides and which agent contains said mercaptides to convert said mercaptides to corresponding disulfides and cupric chloride.

9. The process of claim 8 wherein the oxidation is effected in presence of hydrogen chloride by blowing with air.

10. The process of claim 3 wherein the glycol ether solution in water contains 80% to 95% glycol ether, is substantially saturated with cuprous chloride and the treatment is effected at a temperature in the range 50° F. to 160° F.

11. The process of claim 3 wherein the glycol ether is ethylene glycol monomethyl ether.

12. The process of claim 3 wherein the glycol ether is diethylene glycol monomethyl ether.

13. In a process for sweetening a mercaptan-containing gasoline wherein the gasoline is treated with a reagent comprising cupric and cuprous chlorides for the conversion of said mercaptans to corresponding disulfides, and wherein gasoline soluble copper mercaptides are produced concomitantly, the improvement which comprises separately contacting said treated gasoline with an aqueous solution of a glycol ether whereby said copper mercaptides are removed from said gasoline, and separating the gasoline from the glycol ether solution.

JOHN A. McBRIDE.
SAMUEL C. CARNEY.

REFERENCES CITED

The following references are of record in the file of this patent:

UNITED STATES PATENTS

| Number | Name | Date |
|---|---|---|
| 2,255,417 | Ellis et al. | Sept. 9, 1941 |
| 2,305,549 | Nixon | Dec. 15, 1942 |
| 2,362,219 | Schulze et al. | Nov. 7, 1944 |
| 2,464,019 | Bond et al. | Mar. 8, 1949 |